United States Patent
Lacaze et al.

(10) Patent No.: US 8,346,412 B2
(45) Date of Patent: Jan. 1, 2013

(54) METHOD AND DEVICE FOR ASSISTING AN AIRCRAFT FLIGHT CONTROL DURING LANDING APPROACH

(75) Inventors: Isabelle Lacaze, Colomiers (FR); Vincent Foucart, Ramonville Saint Agne (FR); Jean-Louis De Menorval, Aussonne (FR); Didier Zadrozynski, Toulouse (FR); Frédéric Lemoult, Toulouse (FR); Joëlle Barthe, Toulouse (FR); Sébastien Lhote, Toulouse (FR); Irène Hoste Ventos, Tournefeuille (FR)

(73) Assignee: Airbus Operations SAS, Toulouse (FR)

( * ) Notice: Subject to any disclaimer, the term of this patent is extended or adjusted under 35 U.S.C. 154(b) by 626 days.

(21) Appl. No.: 11/911,611

(22) PCT Filed: May 3, 2006

(86) PCT No.: PCT/FR2006/000989
§ 371 (c)(1),
(2), (4) Date: May 29, 2009

(87) PCT Pub. No.: WO2006/120318
PCT Pub. Date: Nov. 16, 2006

(65) Prior Publication Data
US 2010/0036551 A1 Feb. 11, 2010

(30) Foreign Application Priority Data
May 9, 2005 (FR) .................................... 05 04616

(51) Int. Cl.
*G05D 1/00* (2006.01)
*G05D 1/06* (2006.01)
*G08G 5/02* (2006.01)
*G08G 5/00* (2006.01)

(52) U.S. Cl. ......... 701/18; 701/1; 701/3; 701/4; 701/14; 701/16; 701/17; 701/532; 340/976; 340/951; 342/33; 342/357.53; 244/187

(58) Field of Classification Search ................ 701/1–20, 701/200, 213; 340/947, 948, 951, 971, 972, 340/976, 988; 342/33, 357.01, 357.08
See application file for complete search history.

(56) References Cited

U.S. PATENT DOCUMENTS
4,368,517 A    1/1983  Lovering
(Continued)

FOREIGN PATENT DOCUMENTS
WO       0120583       3/2001

OTHER PUBLICATIONS
PCT International Search Report dated Sep. 6, 2007.

*Primary Examiner* — Thomas Tarcza
*Assistant Examiner* — Adam Tissot
(74) *Attorney, Agent, or Firm* — Dickinson Wright PLLC

(57) ABSTRACT

The inventive flight control assisting device comprises first means (4) for determining the actual aircraft flight conditions, second means (5) for determining, with the aid of said actual flight conditions and a predetermined pattern, a minimum approaching distance corresponding to a minimum distance between projections on the horizontal plane of the aircraft actual position and a touch-down point when said aircraft moves downwards and decelerates according to an optimised approach in such a way that stabilised approaching conditions are attained, and display means (7) for displaying at least said minimum approaching distance on a navigation screen (9) in the form of a first circular arc focused on a position relative to the aircraft which displays the touch-down position.

14 Claims, 4 Drawing Sheets

U.S. PATENT DOCUMENTS

2003/0193410 A1 10/2003 Chen et al.
2004/0044446 A1* 3/2004 Staggs .......................... 701/16
2004/0075586 A1 4/2004 Glover
2004/0167685 A1 8/2004 Ryan et al.

* cited by examiner

METHOD AND DEVICE FOR ASSISTING AN AIRCRAFT FLIGHT CONTROL DURING LANDING APPROACH

The present invention relates to a method and a device for aiding the piloting of an aircraft, in particular of a transport aircraft, during an approach phase for the purpose of landing on an airport landing runway.

It is known that a significant proportion of aircraft accidents occur during an approach phase for the purpose of landing. The main causes of accidents relate in general to:
- unanticipated meteorological conditions;
- inappropriate reactions of pilots;
- a nonoptimal aerodynamic configuration of the aircraft; and
- a nonstabilized approach of the aircraft (which is too high and/or arrives too quickly).

In most cases, had the crews of the aircraft been aware that the real situation of their aircraft did not allow a landing to be carried out under good safety conditions, they would have been able to avoid these incidents by performing a go-around.

It is also known that a go-around is a generally tricky maneuver which is often carried out too late since it is not desired. A go-around is in fact often still considered to be a failure for pilots. So, pilots will in general seek to avoid it to the maximum, if necessary by trying to rescue a difficult situation.

However, if such a go-around maneuver were carried out wittingly whenever necessary, it would make it possible to avoid numerous incidents and accidents that occur in the approach phase (approach to a runway and landing on this runway).

The present invention relates to a method of aiding the piloting of an aircraft during an approach phase for the purpose of landing, and more precisely to a method of aiding the management of energy in the approach, which is aimed at aiding the pilot to take his decision as to whether or not to interrupt the approach phase with a go-around maneuver, in particular by indicating to him all the energy margins for attaining a stabilized approach.

For this purpose, according to the invention, said method is noteworthy in that the following series of successive steps is carried out in an automatic and repetitive manner:
a) current flight conditions of the aircraft are determined;
b) a minimum approach distance which corresponds to a minimum distance between projections onto a horizontal plane of the current position of the aircraft and of a position of contact with the ground is determined, with the aid of said current flight conditions and of a predetermined model, when the aircraft descends and decelerates in accordance with an optimized approach so as to achieve stabilized approach conditions; and
c) at least this minimum approach distance is presented to a pilot of the aircraft, on a navigation screen of ND ("Navigation Display") type, in the form of a first circular arc which is centered on a position relating to the aircraft and which illustrates the position of contact with the ground (and provides a distance cue). Said position relating to the aircraft corresponds to the position that the aircraft has if it is situated on a prescribed trajectory for the purpose of landing or by default to the current position of said aircraft.

Thus, by virtue of the invention, at any instant the pilot knows his aircraft's position of contact with the ground (and therefore his margin in relation to the runway) if he implements an optimized approach, for which the horizontal distance from the current position of the aircraft up to the contact position of the aircraft on the landing runway is the smallest possible, as a function in particular of the aerodynamic braking capabilities of the aircraft (taken into account in said model) and of the current flight conditions.

In an advantageous manner, in step c), a symbol which illustrates the position of a landing runway scheduled for the landing and which indicates at least the threshold of this landing runway is presented moreover, on said navigation screen, said first circular arc being situated on the lateral trajectory of the aircraft, on which said symbol illustrating the position of the landing runway is also presumed to be situated.

Thus, when on said navigation screen said first circular arc oversteps said threshold of the landing runway illustrated by this symbol, the pilot knows that it will be impossible for him to achieve stabilized approach conditions for the purpose of carrying out the landing on said landing runway, unless perhaps he changes his lateral profile.

According to the invention, said stabilized approach conditions assume that the aircraft exhibits a predetermined approach speed and approach slope that are stabilized (that is to say constant) at a predetermined height relative to the ground, for example 500 feet (about 150 meters) or 1000 feet (about 300 meters), down to a height, for example 50 feet (about 15 meters), in direct proximity to the landing runway.

Consequently, by virtue of said first circular arc and of said symbol presented on the navigation screen, the pilot is afforded valuable aid in taking his decision to possibly interrupt an approach phase, since by virtue of this information he knows when the approach is nonstabilized and nonrecoverable. In such a situation, he need then no longer hesitate to carry out a go-around maneuver (or an energy loss maneuver). This will without doubt make it possible to avoid numerous incidents and accidents during the approach phase and to better manage the approach so as to reduce the number of go-arounds.

To properly apprise the pilot of any critical situation of the aforesaid type, advantageously, an alert signal is emitted in the flight deck of the aircraft, when said first circular arc is situated beyond the threshold of the landing runway (with respect to the current position of the aircraft), that is to say when the position of the contact point of the aircraft (relating to an optimized approach such as previously indicated) is situated beyond said threshold of the landing runway so that the landing will not be able to be carried out at all, or at the very least not under good safety conditions.

In a particular embodiment, in step a) at least the following are determined (more precisely, are estimated or are measured in a customary manner) as current flight conditions of the aircraft:
- the height of the aircraft with respect to the ground;
- the speed of the aircraft; and
- the aerodynamic configuration of said aircraft.

Furthermore, advantageously, said model intended for determining the minimum approach distance as a function of the current flight conditions comprises a neural net. In this case, preferably, said neural net determines said minimum approach distance, as a function of said current flight conditions and of said stabilized approach conditions, as well as at least of the following parameters:
- the atmospheric pressure at ground level;
- the mass of the aircraft; and
- the longitudinal instantaneous wind.

Moreover, in a particular embodiment, said neural net depends on the type of said aircraft, in particular its aerodynamic characteristics and its performance. This makes it possible to optimize the model and to adapt it to the aircraft on which the present invention is implemented.

Advantageously, said neural net is determined during a preliminary step, prior to the flight of the aircraft.

Furthermore, in an advantageous manner, said minimum approach distance is determined by taking into account an optimal descent profile as a function of said current flight conditions.

In a particular embodiment, moreover:
in step b), a second approach distance which corresponds to a distance between projections onto a horizontal plane of the current position of the aircraft and of a position of contact with the ground is determined, when the aircraft descends and decelerates in accordance with a standard approach (in relation to aeronautical directives) so as to achieve the stabilized approach conditions; and
in step c), this second approach distance is presented to the pilot of the aircraft on said navigation screen in the form of a second circular arc which is centered on said position relating to the aircraft and which illustrates the position of contact with the ground (relating to a standard approach).

The present invention also relates to a device for aiding the piloting of an aircraft, in particular of a transport aircraft, during an approach phase for the purpose of landing on an airport landing runway.

According to the invention, said device is noteworthy in that it comprises:
first means for determining current flight conditions of the aircraft;
second means for determining, with the aid of said current flight conditions and of a predetermined model, a minimum approach distance which corresponds to a minimum distance between projections onto a horizontal plane of the current position of the aircraft and of a position of contact with the ground, when the aircraft descends and decelerates in accordance with an optimized approach so as to achieve stabilized approach conditions; and
display means for presenting, on a navigation screen, at least this minimum approach distance in the form of a first circular arc which is centered on the (aforesaid) position relating to the aircraft and which illustrates the position of contact with the ground.

Preferably, said second means comprise a neural net.

Furthermore, in a particular embodiment, said device in accordance with the invention comprises, moreover, alert means capable of emitting an alert signal (audible and/or visual) in the flight deck of the aircraft, when said first circular arc is situated beyond the threshold of a landing runway scheduled for the landing.

The figures of the appended drawing will elucidate the manner in which the invention can be carried out. In these figures, identical references designate similar elements.

Figure 1:
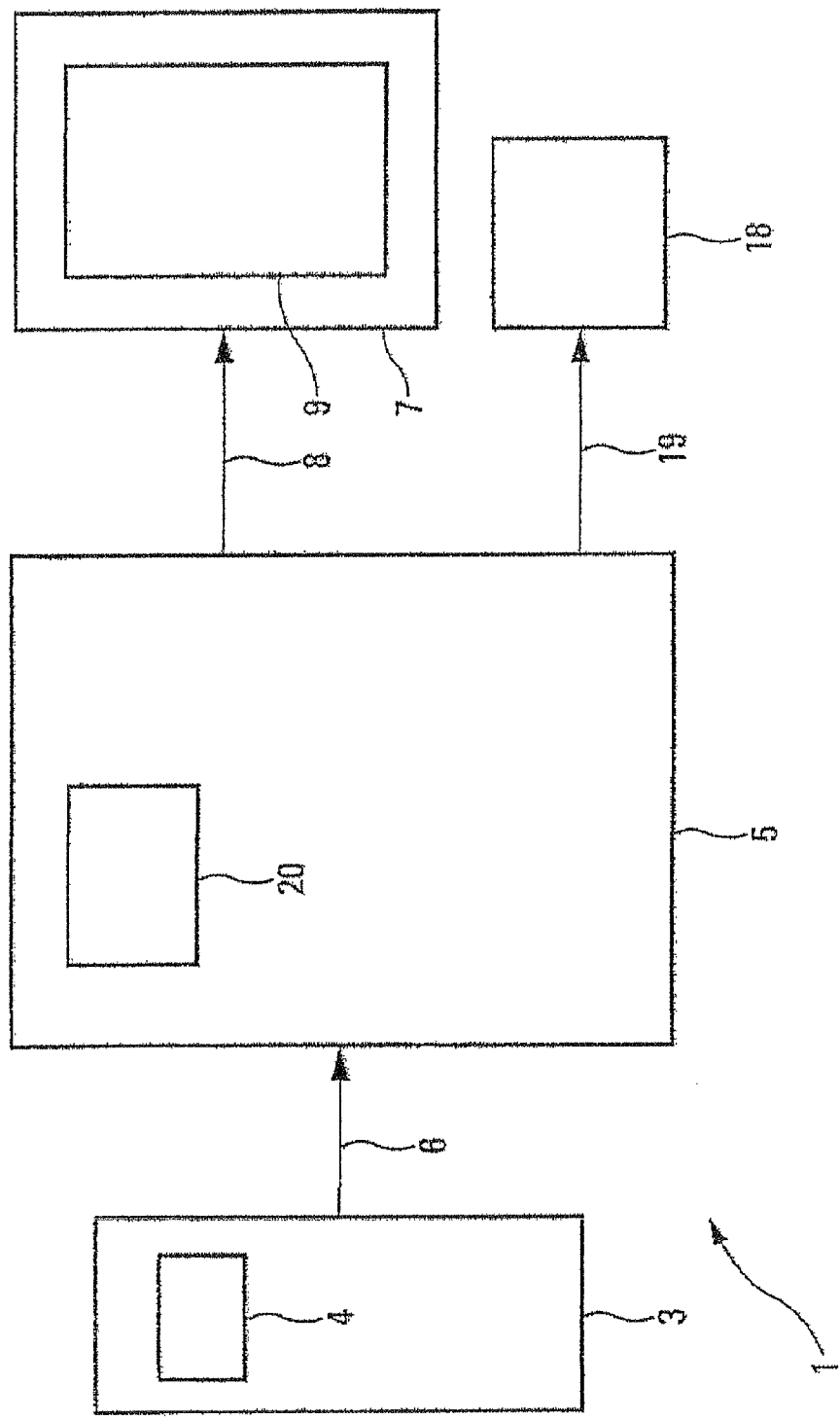
FIG. 1 is the schematic diagram of a device for aiding piloting in accordance with the invention.
Figure 2:
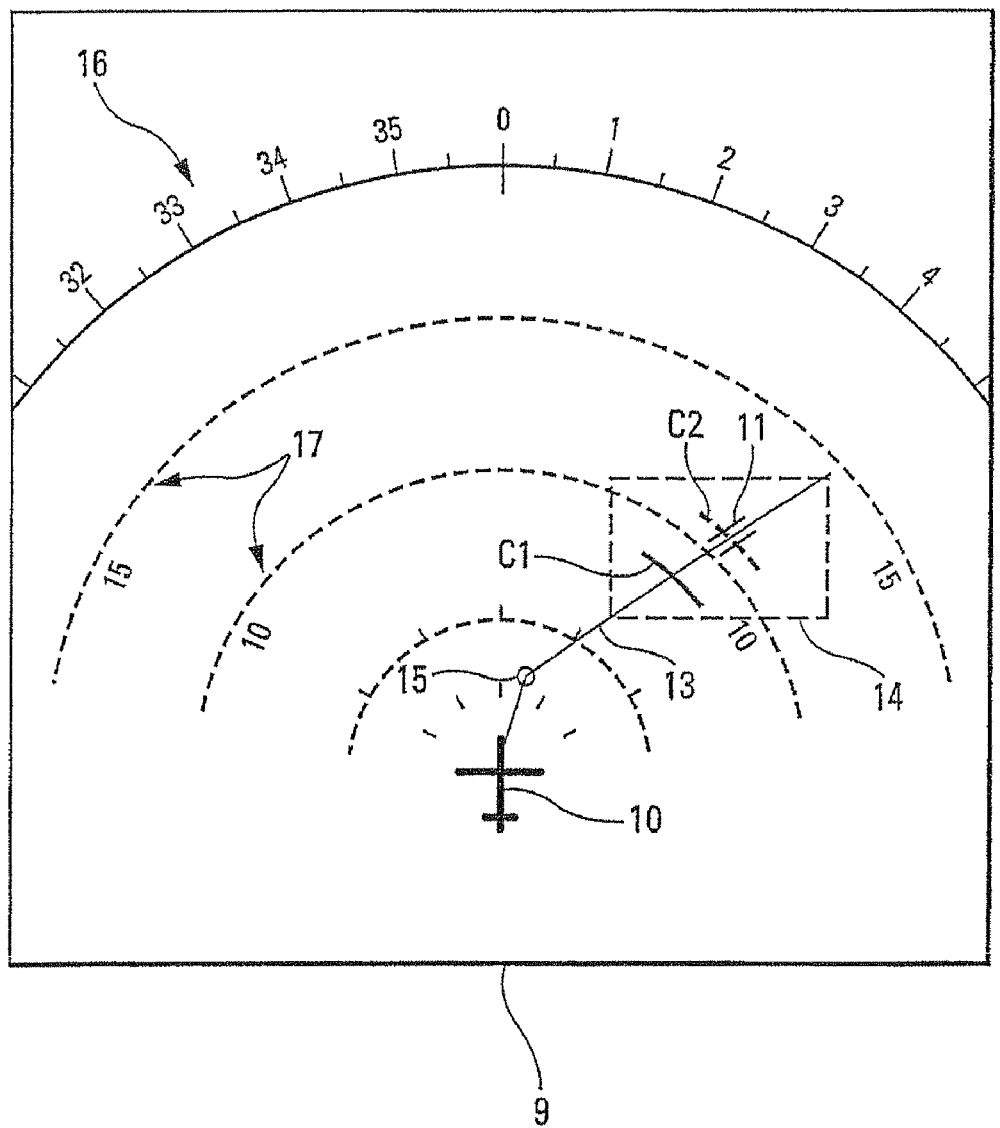
FIG. 2 shows a navigation screen comprising the information presented in accordance with the present invention.

The device 1 in accordance with the invention and schematically represented in FIG. 1 is intended to aid a pilot to pilot an aircraft A, in particular a wide-bodied transport aircraft, during the approach to a landing runway 2 for the purpose of a landing on this runway 2.

According to the invention, said device 1 comprises:
a set 3 of information sources which comprise at least means 4 for determining, in particular for measuring or estimating, in a customary manner, current flight conditions of the aircraft A. More precisely, said means 4 determine at least the following current flight conditions:
the height of the aircraft A with respect to the ground;
the speed of the aircraft A; and
the aerodynamic configuration (positions of the slats and flaps in particular) of said aircraft A;
a central unit 5 which is connected by a link 6 to said set 3 of information sources, and which determines, with the aid of the current flight conditions received from said means 4 and of a predetermined model specified below, a minimum approach distance Dmin which corresponds to a minimum distance (profile achievable by the pilot) between first and second projections onto a horizontal plane, on the one hand of the current position of the aircraft A and, on the other hand of a position of contact with the ground of said aircraft A, when the latter descends and decelerates from its current position, in accordance with an optimized approach specified below, so as to achieve stabilized approach conditions, also specified hereinafter; and
display means 7 which are connected by a link 8 to said central unit 5 and which are intended to present, on a customary navigation screen 9 of ND ("Navigation Display") type, at least this minimum approach distance Dmin, in the form of a circular arc C1 which is centered on a position relating to the aircraft A. Said position relating to the aircraft A corresponds to the position that the aircraft A has if it is situated on a prescribed trajectory for the purpose of landing or by default to the current position of said aircraft A, illustrated in a customary manner by a symbol 10. The circular arc C1 is separated from said symbol 10 by a distance representative of this distance Dmin. This circular arc C1 shows the contact position of the aircraft A with the ground if it carries out an optimized approach making it possible to obtain the smallest possible distance Dmin. It also provides the pilot with distance information (aircraft-contact position).

Thus, by virtue of said device 1, at any instant the pilot knows his aircraft's A position of contact with the ground if he implements an optimized approach, for which the horizontal distance from the current position of the aircraft A up to the contact position of the aircraft A on the landing runway 2, is the smallest possible, as a function in particular of the aerodynamic braking capabilities of the aircraft A (taken into account in said model) and of the current flight conditions (received from said means 4).

According to the invention, said display means 7 present moreover, on said navigation screen 9, a symbol 11 which illustrates the position of the landing runway 2 scheduled for the landing of the aircraft A and which signals at least the position of the upstream threshold 12 of said landing runway 2. According to the invention, said circular arc C1 is situated by definition on the lateral trajectory 13 which is followed by the aircraft A and which passes through said symbol 11 on the navigation screen 9, so as to direct the aircraft A towards the landing runway 2.

Consequently, when on said navigation screen 9, said circular arc C1 oversteps the threshold 12 of the landing runway (symbol 11), the pilot knows that it will be impossible for him to achieve the stabilized approach conditions for the purpose of carrying out the landing on the landing runway 2, unless perhaps he changes his lateral profile.

Thus, by virtue of said circular arc C1 and of said symbol 11 presented on the navigation screen 9, the device 1 in accordance with the invention affords the pilot valuable aid in taking his decision to possibly interrupt an approach phase, since by virtue of this information he knows when the approach is nonstabilized and nonrecoverable. In such a situation, he need then no longer hesitate to carry out a go-around maneuver. This will without doubt make it possible to avoid numerous incidents and accidents during the approach phase.

By definition, a go-around is a flight phase during which the landing operations in progress are not carried through to completion.

In a particular embodiment:
said central unit 5 determines an approach distance DO which corresponds to a distance between first and third projections onto a horizontal plane, on the one hand of the current position of the aircraft A and, on the other hand of a position of contact with the ground, when the aircraft A descends and decelerates from its current position, in accordance with a standard approach (that is to say in accordance with an approach which is carried out in a regulatory and customary manner) so as to achieve said stabilized approach conditions; and
said display means 7 present, on said navigation screen 9, this approach distance DO in the form of a circular arc C2 which is also centered on the aforesaid position relating to the aircraft A (symbol 10) and which illustrates the position of contact with the ground for a standard approach such as this.

According to the invention, said stabilized approach conditions assume that the aircraft A exhibits a predetermined approach speed and approach slope that are stabilized (that is to say constant) at a predetermined height relative to the ground, for example 500 feet (about 150 meters) or 1000 feet (about 300 meters), down to a height, for example 50 feet (about 15 meters), in direct proximity to the landing runway 2.

Figure 3:
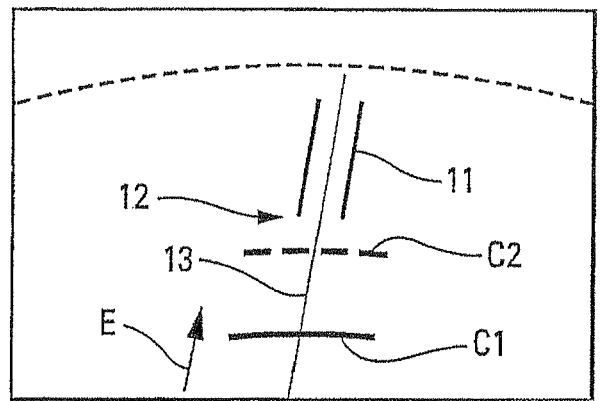
FIGS. 3 to 5 represent a part of the navigation screen of FIG. 2, respectively for different approach phases.
Figure 4:
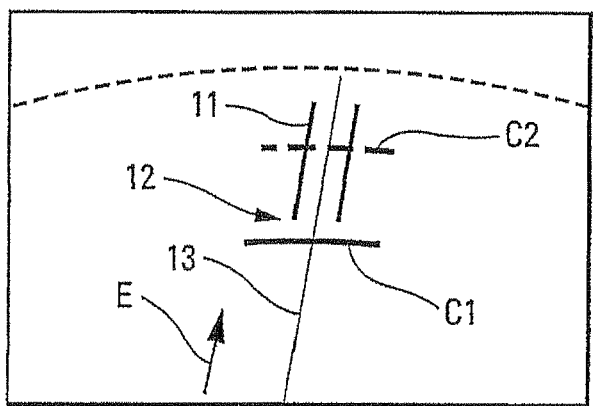
Figure 5:
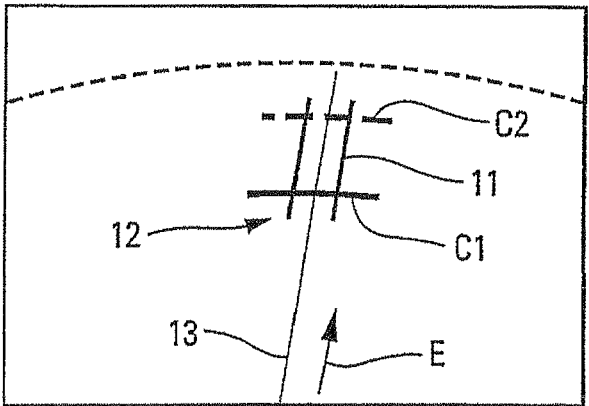

By way of illustration, reference is made hereinafter to three different situations represented respectively in FIGS. 3 to 5 which show a part 14 of the navigation screen 9 comprising in particular the circular arcs C1 and C2 and the symbol 11:
in the example of FIG. 3, the circular arcs C1 and C2 are situated upstream of the threshold 12 of the landing runway (symbol 11) in the direction E of flight of the aircraft A so that the aircraft A can in this example carry out an approach, both in accordance with an optimized approach and in accordance with a standard approach;
in the example of FIG. 4, the circular arc C1 (optimized approach) is situated upstream of the threshold 12 of the landing runway 2, while the circular arc C2 (standard approach) is situated beyond (downstream) said threshold 12 of the landing runway 2. In this example, the aircraft A cannot carry out a standard approach. On the other hand, an optimized approach is still possible; and
in the example of FIG. 5, the two circular arcs C1 and C2 are situated beyond (downstream) the threshold 12 of the landing runway 2 so that neither a standard approach nor an optimized approach are possible. In this example, the pilot must therefore implement a go-around maneuver.

The display means 7 present, moreover, in a customary manner, on the navigation screen 9, in particular:
a plot 13 showing the theoretical flight trajectory of the aircraft A in the horizontal plane with course points 15;
a customary graduation 16 in angular deviations; and
a customary graduation 17 in distance, defined with respect to the current position of the aircraft A illustrated by the symbol 10.

The device 1 in accordance with the invention comprises, moreover, alert means 18 which are connected by a link 19 to said central unit 5 and which are capable of emitting an alert signal in the flight deck of the aircraft A, when said circular arc C1 is situated beyond the threshold 12 of the landing runway 2 (with respect to the current position of the aircraft A), that is to say when the position of the contact point of the aircraft A (relating to an optimized approach such as previously indicated) is situated beyond said threshold 12 of the landing runway 2 so that the landing will not be able to be carried out at all, or at the very least not under good safety conditions. Said alert signal can be an audible signal and/or a visual signal, in particular an alert message and/or a change of color or of shape pertaining to information displayed on the navigation screen 9, such as the circular arc C1 and/or the symbol 11 for example.

Consequently, by virtue of the device 1 in accordance with the invention, indications are made available to the pilot which allow him to manage the energy of the aircraft A and, if appropriate, to perform corrections on the energy state or if necessary a go-around. Said device 1 thus makes it possible to reduce the number of incidents during approach phases. The incidents which are covered by said device 1 are in particular runway exits, hard landings, results of nonstabilized approaches caused by surplus energy (too high, too quick). Furthermore, by virtue of the invention, it is possible to carry out in particular:
monitoring of the energy in the approach phase between 10 000 feet (about 3000 meters) and 500 feet (about 150 meters), 500 feet being the ultimate altitude in order to be stabilized by procedure; and
aid with the decision to carry out a go-around between 500 feet and 50 feet (about 15 meters), where the aircraft A must be stabilized on a predetermined approach slope (generally 3°) forming an approach axis PA, doing so at a predetermined customary approach speed.

Additionally, said model is used by a calculation module 20 of the central unit 5 to determine the minimum approach distance Dmin. Therefore, this calculation module 20 comprises a neural net. Preferably, this neural net makes it possible to determine said minimum approach distance Dmin, as a function of said current flight conditions and of said stabilized approach conditions, as well as of the following parameters:
the atmospheric pressure at ground level;
the mass of the aircraft A; and
the longitudinal instantaneous wind.

Moreover, in a particular embodiment, said neural net depends on the type of said aircraft A, in particular its characteristics and aerodynamic performance. This makes it possible to optimize the model and to adapt it to the aircraft A on which the device 1 is installed.

According to the invention, said neural net is determined on the ground during a preliminary step, prior to the flight of the aircraft A.

Furthermore, said calculation module 20 determines said minimum approach distance Dmin, by taking into account an optimal descent profile as a function of said current flight conditions of the aircraft A.

Figure 6:
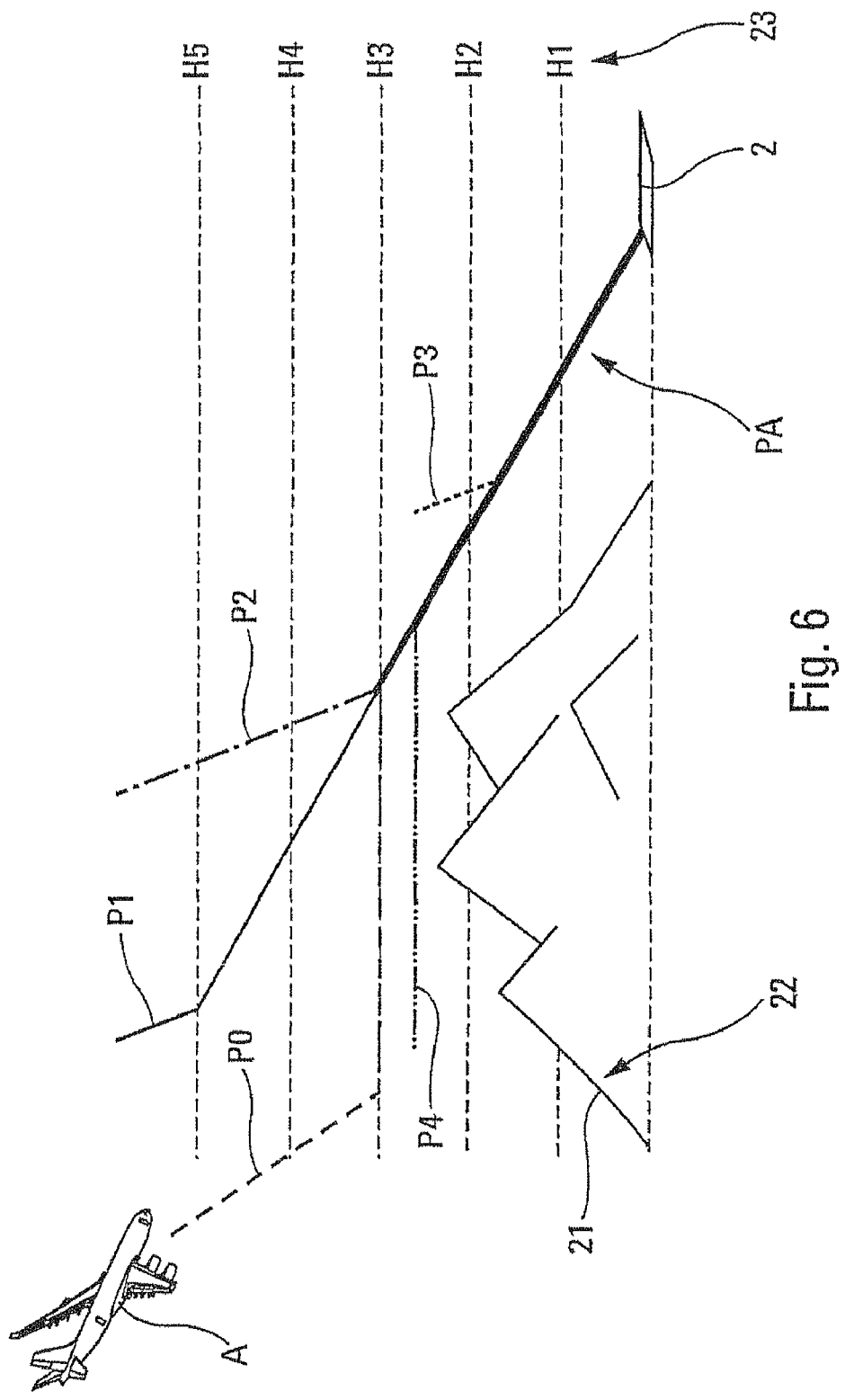
FIG. 6 is a graphic illustrating various approach trajectories capable of being followed by an aircraft, in accordance with the present invention, for the purpose of a landing on a landing runway.

Represented in FIG. 6 are various (descent) profiles referenced P0 to P4, making it possible to carry out a landing on the runway 2 by overflying the relief 21 of the surrounding terrain 22, as well as a height scale 23 whose values H1 to H5 signalled are for example separated each time by 50 feet (about 15 meters). Said reference profiles P0 to P4 are optimal energy loss profiles which cover all the initial altitude and speed conditions of the aircraft A. Thus, in accordance with said initial altitude and speed conditions, the central unit 5 chooses the energy loss profile P0, P1, P2, P3, P4 which is optimal (which makes it possible in particular to obtain the smallest distance Dmin), and the calculation module 20 uses said profile to calculate said distance Dmin in accordance with said integrated model.

By referring to FIG. 6, wherein is represented the aircraft A which follows a standard descent profile P0, it is possible to consider that:

when the aircraft A is in a smooth configuration, one seeks to carry out a descent at a customary maximum speed VLO (known by the expression "Maximum Landing Gear Operating Speed") in a smooth configuration, with the landing gear and the flaps extended, before decelerating on a vertical approach axis (profile P1). This vertical approach axis is an axis PA (termed "glide") which is issued within the framework of a customary instrument approach and landing of ILS ("Instrument Landing System") type;

when the aircraft A is in an enhanced-lift configuration, one seeks to carry out a descent at a customary maximum speed with flaps extended VFE ("Maximum Speed with Flaps Extended") in a configuration termed "FULL", with the landing gear and the flaps extended, before decelerating on the vertical approach axis PA (profile P2);

when the aircraft A is under the altitude of the standard procedure P0 (which is defined by the relief 21 of the approach terrain 22) and under the vertical approach axis PA, the aircraft A performs staged decelerations, with the landing gear and the flaps extended, before continuing the deceleration on said vertical approach axis PA (profile P4 which is a profile which is nonoptimal, but which favors safety relative to the relief); and when the aircraft A is under the standard procedure altitude, but above the vertical approach axis PA, a descent in the enhanced-lift configuration is undertaken at the initial speed (if this initial speed is below the VFE speed of the "FULL" configuration), with the landing gear and the flaps extended, before decelerating on said vertical approach axis PA (profile P3).

The invention claimed is:

1. A method of aiding the piloting of an aircraft during an approach phase for the purpose of landing, according to which method the following series of successive steps is carried out in an automatic and repetitive manner:
a) determining current flight conditions of the aircraft;
b) dynamically determining a minimum approach distance between a current position of the aircraft and a position of contact with the ground at least with the aid of said current flight conditions; and
c) presenting at least the minimum approach distance to a pilot of the aircraft on a navigation screen, wherein:
step b) further comprises dynamically determining said minimum approach distance with the aid of said current flight conditions, as well as with the aid of a predetermined model which takes account of aerodynamic braking capabilities of the aircraft;
step b) further comprises dynamically determining said minimum approach distance as a minimum distance between projections onto a horizontal plane of the current position of the aircraft and the position of contact with the ground, when the aircraft descends and decelerates in accordance with an optimized approach so as to achieve stabilized approach conditions, said optimized approach being dynamically determined to obtain the smallest possible minimum distance;
step b) further comprises dynamically determining a second approach distance which corresponds to a distance between other projections onto the horizontal plane of the current position of the aircraft and another position of contact with the ground, when the aircraft descends and decelerates in accordance with a standard approach so as to achieve the stabilized approach conditions; and
step c) further comprises simultaneously presenting the following to the pilot of the aircraft on said navigation screen:
the minimum approach distance, in the form of a first circular arc which is centered on a position relating to the aircraft and which illustrates the position of contact with the ground relating to the optimized approach; and
the second approach distance, in the form of a second circular arc which is centered on said position relating to the aircraft and which illustrates the other position of contact with the ground relating to the standard approach,
wherein step c) further comprises presenting a symbol which illustrates a position of a landing runway scheduled for the landing and which indicates at least a threshold of the landing runway on said navigation screen, and presenting said first circular arc on a lateral trajectory of the aircraft, and
wherein step c) enables the pilot to select between landing the aircraft using the optimized approach or landing the aircraft using the standard approach.

2. The method as claimed in claim 1,
further comprising emitting an alert signal in a flight deck of the aircraft, when said first circular arc is situated beyond the threshold of the landing runway.

3. The method as claimed in claim 1,
wherein step a) further comprises determining at least the following current flight conditions of the aircraft:
a height of the aircraft with respect to the ground;
a speed of the aircraft; and
an aerodynamic configuration of said aircraft.

4. The method as claimed in claim 1, wherein said stabilized approach conditions are based on an assumption that the aircraft exhibits a predetermined approach speed and approach slope that are stabilized at a predetermined height relative to the ground.

5. The method as claimed in claim 1,
wherein a neural net uses said predetermined model to determine the minimum approach distance as a function of the current flight conditions.

6. The method as claimed in claim 5,
wherein said neural net determines said minimum approach distance as a function of said current flight conditions, said stabilized approach conditions, and at least the following parameters:
an atmospheric pressure at ground level;
a mass of the aircraft; and
a longitudinal instantaneous wind.

7. The method as claimed in claim 5,
wherein said neural net depends on a type of said aircraft.

8. The method as claimed in claim 5,
further comprising determining said neural net during a preliminary step, prior to a flight of the aircraft.

9. The method as claimed in the claim 1,
further comprising determining said minimum approach distance by taking into account an optimal descent profile as a function of said current flight conditions.

10. A device for aiding the piloting of an aircraft during an approach phase for the purpose of landing, said device comprising:
- a first unit for determining current flight conditions of the aircraft;
- a second unit for dynamically determining, at least with the aid of said current flight conditions, a minimum approach distance between a current position of the aircraft and a position of contact with the ground; and
- a display unit for presenting, on a navigation screen, at least the minimum approach distance, wherein:

said second unit comprises:
- a minimum approach distance determining unit for dynamically determining said minimum approach distance with the aid of said flight conditions and with the aid of a predetermined model which takes account of aerodynamic braking capabilities of the aircraft, said minimum approach distance corresponding to a minimum distance between projections onto a horizontal plane of the current position of the aircraft and the position of contact with the ground, when the aircraft descends and decelerates in accordance with an optimized approach so as to achieve stabilized approach conditions, said optimized approach being dynamically determined to obtain the smallest possible minimum distance; and
- a second approach distance determining unit for dynamically determining a second approach distance which corresponds to a distance between other projections onto the horizontal plane of the current position of the aircraft and another position of contact with the ground, when the aircraft descends and decelerates in accordance with a standard approach so as to achieve the stabilized approach conditions; and said display unit is formed to simultaneously present the following to a pilot of the aircraft on said navigation screen:
- the minimum approach distance, in the form of a first circular arc which is centered on a position relating to the aircraft and which illustrates the position of contact with the ground relating to the optimized approach; and
- the second approach distance, in the form of a second circular arc which is centered on said position relating to the aircraft and which illustrates the other position of contact with the ground relating to the standard approach, wherein the display unit is further configured to present a symbol which illustrates a position of a landing runway scheduled for the landing and which indicates at least a threshold of the landing runway on said navigation screen, and to present said first circular arc on a lateral trajectory of the aircraft, to enable the pilot to select between landing the aircraft using the optimized approach or landing the aircraft using the standard approach.

11. The device as claimed in claim 10, wherein said second unit comprises a neural net.

12. The device as claimed in claim 10, further comprising an alert unit configured to emit an alert signal in a flight deck of the aircraft, when said first circular arc is situated beyond the threshold of the landing runway scheduled for the landing.

13. An aircraft, comprising a device capable of implementing the method specified under claim 1.

14. An aircraft, comprising a device such as that specified under claim 10.

* * * * *